(12) United States Patent
Maloy

(10) Patent No.: US 10,997,118 B1
(45) Date of Patent: May 4, 2021

(54) GENERATING A FRESH MACHINE IMAGE

(71) Applicant: Amazon Technologies, Inc., Seattle, WA (US)

(72) Inventor: Sean Ryley Maloy, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 415 days.

(21) Appl. No.: 14/973,661

(22) Filed: Dec. 17, 2015

(51) Int. Cl.
*G06F 16/215* (2019.01)
*G06F 16/11* (2019.01)
*G06F 9/4401* (2018.01)

(52) U.S. Cl.
CPC ........ *G06F 16/128* (2019.01); *G06F 9/4401* (2013.01)

(58) Field of Classification Search
CPC ............... G06F 9/45558; G06F 2009/45579
USPC ....................................................... 707/649
See application file for complete search history.

(56) References Cited

U.S. PATENT DOCUMENTS

| | | | |
|---|---|---|---|
| 8,346,727 B1* | 1/2013 | Chester | G06F 16/188 707/640 |
| 8,996,468 B1* | 3/2015 | Mattox | G06F 11/14 707/650 |
| 10,133,593 B1* | 11/2018 | Sethuramalingam | G06F 9/45558 |
| 2004/0139273 A1* | 7/2004 | Doucette | G06F 3/0689 711/100 |
| 2012/0323853 A1* | 12/2012 | Fries | G06F 11/3072 707/649 |
| 2014/0229936 A1* | 8/2014 | Gaonkar | G06F 9/45558 718/1 |
| 2015/0120669 A1* | 4/2015 | Ibanescu | G06F 8/61 707/649 |
| 2015/0254080 A1* | 9/2015 | Zhang | G06F 9/4406 713/2 |
| 2016/0055027 A1* | 2/2016 | Bolte | G06F 9/45558 718/1 |
| 2016/0124977 A1* | 5/2016 | Jain | G06F 11/1446 707/649 |

OTHER PUBLICATIONS

"Copying an AMI", Oct. 9, 2015, Amazon Web Services <http://docs.aws.amazon.com/AWSEC2/latest/UserGuide/CopyingAMIs.html>.*
"NTFS Basics", Oct. 13, 2015, Active Data Recovery Software <http://www.ntfs.com/ntfs_basics.htm>.*
"Copying an AMI", Oct. 9, 2015, Amazon Web Services <http://docs.aws.amazon.com/AWSEC2/latest/UserGuide/CopyingAMIs.html> (Year: 2015).*
"NTFS Basics", Oct. 13, 2015, Active Data Recovery Software <http://www.ntfs.com/ntfs_basics.htm> (Year: 2015).*
Jeff Barr, "New—Encrypted EBS Boot Volumes", Dec. 15, 2015, <aws.amazon.com> (Year: 2015).*
"How do decrease size of EBS boot volume", 2010, <forums.aws.amazon.com> (Year: 2010).*

* cited by examiner

*Primary Examiner* — Mohammad S Rostami
*Assistant Examiner* — Robert F May
(74) *Attorney, Agent, or Firm* — Davis Wright Tremaine LLP

(57) ABSTRACT

A system and method of generating a cleaned machine image. One example includes capturing used machine image data stored in a first boot volume to generate a set of captured machine image data and extracting at least a portion of the set of captured machine image data to the second volume to generate a cleaned machine image.

20 Claims, 9 Drawing Sheets

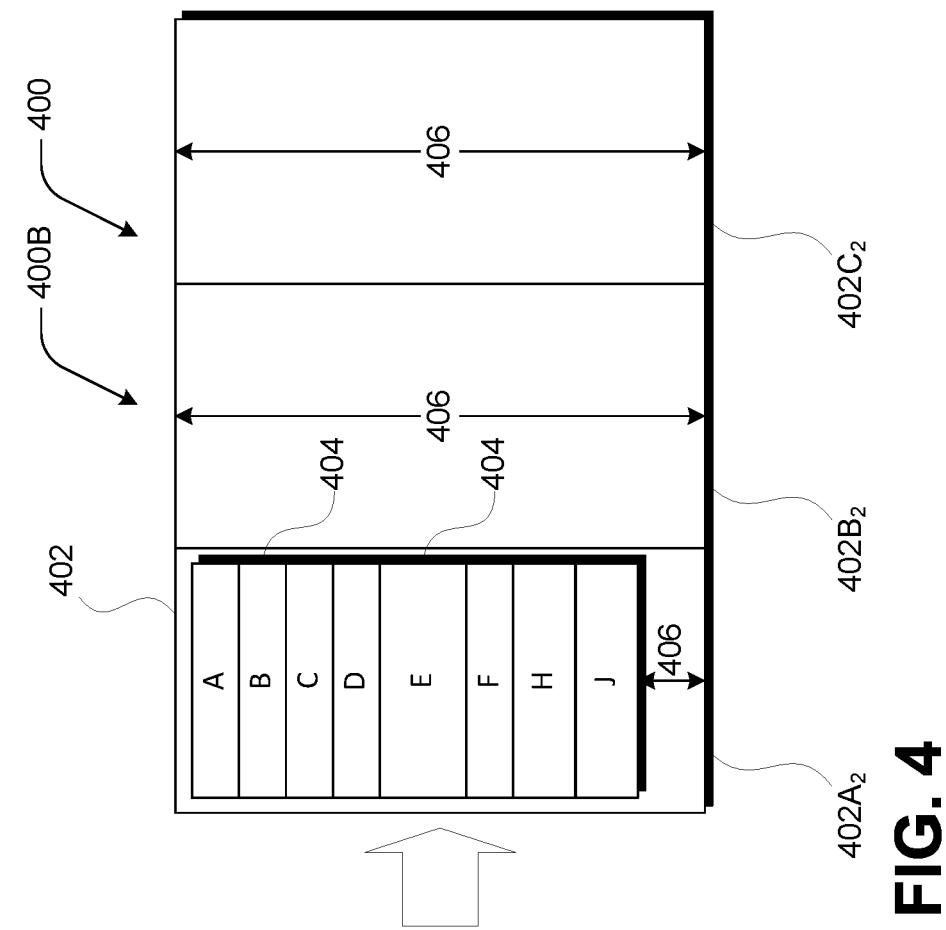
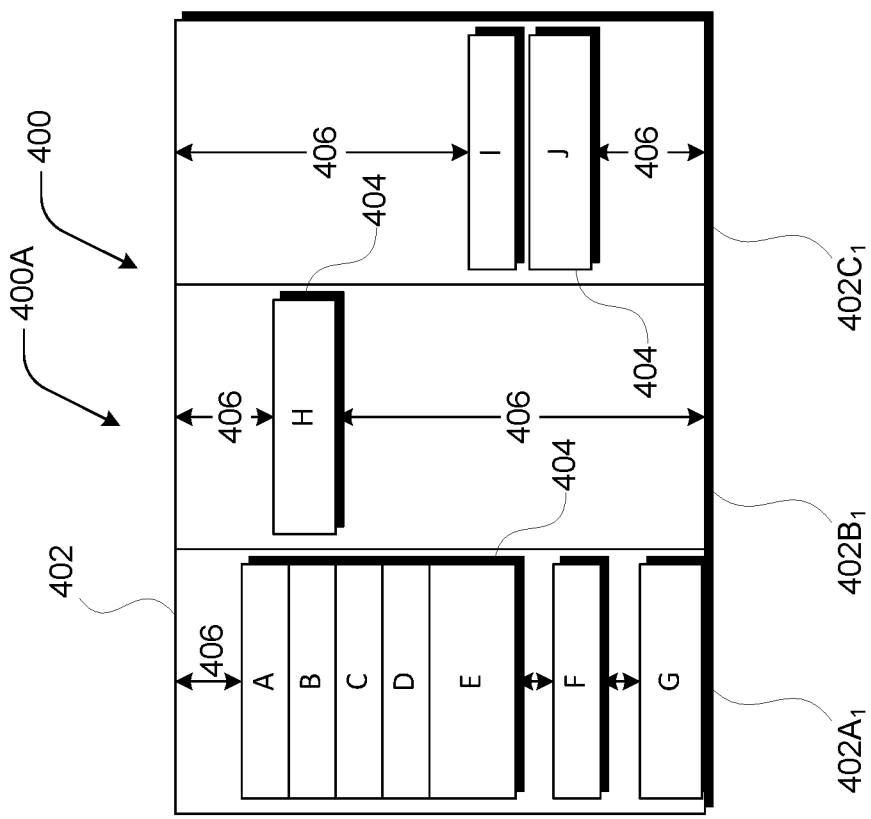
FIG. 4

GENERATING A FRESH MACHINE IMAGE

BACKGROUND

Running a machine image over time can cause the machine image to bloat. In other words, a machine image can become less efficient over time by consuming greater hardware and software resources and taking more time to perform operations. Operations such as trimming and defragmenting can be used to clean a machine image at a block level, but are unable to completely reverse machine image bloat that can occurs over time because of limitations of both the operating system and the sub-system.

For example, the unused memory space within memory blocks can be recognized as unused space by a file system kernel, but where a given block comprises any data, the block will still be identified as a used block by the underlying disc infrastructure. Sub-system trimming operations can be used to clean up a boot drive by marking blocks without data as un-used, which allows new data to be written to that block more efficiently. However, where any data is stored in a block, even a small portion, such a sub-system trimming operation would not be able to recapture the block for efficient use.

Operating system operations such as defragment can be used to make a boot volume operate more efficiently by logically reordering blocks of the boot volume. However, when the operating system writes to logically synchronous blocks, the data may actually span multiple physical blocks, which still does not preclude small bits of data from preventing mostly unused blocks from being recaptured by a trimming operation. Accordingly, the operating system is unable to effectively clean up the disc via defragmentation and the sub-system is also unable to effectively clean up the disc via trim, which results in an increasingly bloated disc over time as the machine image executes over time.

BRIEF DESCRIPTION OF THE DRAWINGS

Various techniques will be described with reference to the drawings, in which:

FIG. 4 illustrates the transfer of machine image data from a first boot volume to a second volume for generating a fresh machine image in accordance with one example;

DETAILED DESCRIPTION

Figure 1:
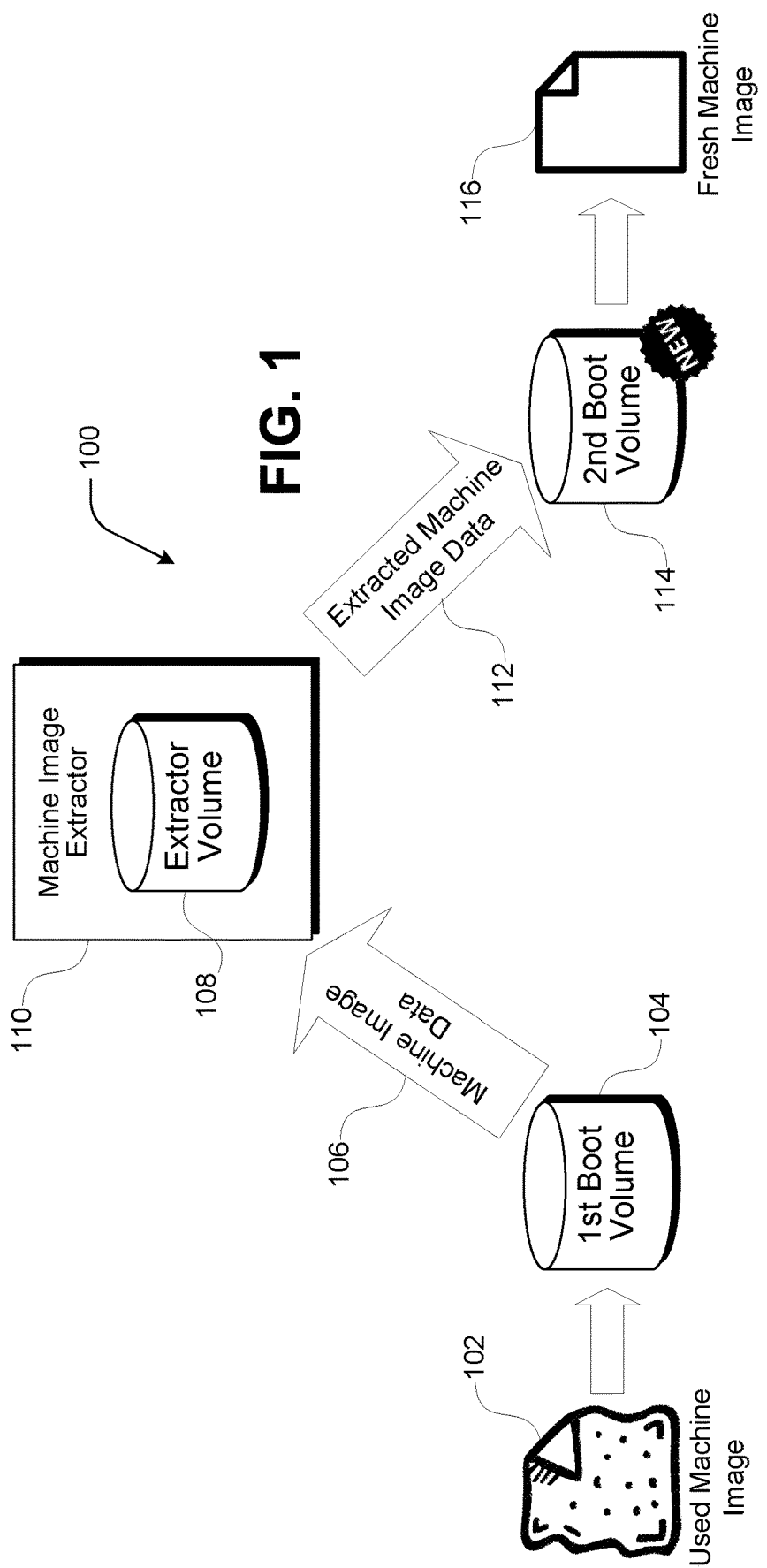
FIG. 1 illustrates a method of generating a fresh machine image that includes extracting a used machine image from a first boot volume to a second new boot volume, in accordance with one example.

The following disclosure describes techniques for cleaning a used machine image to generate a fresh machine image that results in more efficient computer performance than the used machine image. One method of generating a fresh machine image includes loading a used and bloated machine image into a first boot volume and with a machine image extractor, capturing and compressing of a portion of the machine image data in the first boot volume. For example, the machine image extractor can selectively capture and compress machine image data that maintains the state of the machine image, but removes redundant or unnecessary portions of the machine image data. In other words, a fresh copy of the machine image is generated that removes bloat and other inefficiencies present in the machine image.

A new fresh second volume can be generated, and the captured and compressed machine image data can be extracted to the new fresh boot volume by the machine image extractor. For example, such an extraction can lay down the machine image data contiguously starting at a beginning of the new fresh boot volume, which can be an efficient arrangement of the machine image data. The fresh machine image may not be a file-level copy (where files are transferred without reference to block-level structure). Also, the fresh machine image may not be a block-level copy (where blocks are copied without reference to the contents of the blocks).

Extraction of machine image data from the first boot volume can include various suitable steps. For example, the machine image extractor can read the first boot volume to identify a file structure and identify a set of machine image objects such as directories, files, folders, and the like. These identified machine image objects can be copied to a temporary directory at the machine image extractor in a suitable file format, which may or may not be a compressed file format.

Capturing machine image objects from first boot volume can comprise use of white-listing and/or black-listing of certain machine image objects. In other words, certain machine image objects can be specifically identified for exclusion from extraction or specifically identified for inclusion in an extraction. For example, it can be desirable to exclude files that are not necessary or non-essential to the machine image during capture, including temporary files, kernel-related files, and the like.

Additionally, capturing machine image data by the machine image extractor can include reading boot sector data at the first boot volume and storing boot sector metadata corresponding to the boot sector data at the machine image extractor. For example, boot sector metadata can be stored in a compressed file comprising extracted machine image objects. In other words, boot sector metadata can be extracted so that partitioning information of the first boot volume, and the like, can be preserved.

Accordingly, information about the boot sector can be extracted without directly copying the boot sector. In other words, the boot sector from the first boot volume can be re-created on the second fresh boot volume, based on boot sector metadata, but without directly copying the boot sector. In doing so, essential information about the boot sector can be re-created at the second fresh boot volume, which can include partitioning information, and the like.

In various examples, a boot sector or boot block can be a region of a virtual or non-virtual memory that contains machine code to be loaded into random-access memory (RAM) by a computer system's built-in firmware to initiate the boot process of a computer loading a program such as an operating system. In various examples, a boot volume can comprise a disc or memory volume that contains operating system files and/or operating system supporting files.

Generating a fresh second volume can include preparing and partitioning of the fresh second volume, which may be necessary so that the fresh second volume becomes writable and recognizable by the machine image extractor.

Generating the fresh machine image can also include comparing the extracted machine image metadata present on the fresh second volume to machine image metadata present on the first boot volume. In some examples, generating a fresh machine image can include modifying machine image metadata present on the fresh second volume to correspond to machine image metadata present on the first boot volume. Comparing the machine image metadata present on the first and second volumes can be done in any suitable way, including an item-by-item comparison, or overwriting a portion of the machine image metadata present on the second volume with default machine image metadata. Additionally, further metadata or other files can be appended to the machine image data that has been extracted to the second volume, which can include metadata or data corresponding to operation of the machine image in a certain computing environment.

Methods of generating a clean machine image can be applied to machine images in virtual and non-virtual computing environments. For example, in a virtual computing environment, a virtual machine can be instantiated from a virtual machine snapshot that includes a machine image for the virtual machine instance. A portion of this virtual machine snapshot can be cleaned so that the state information of the virtual machine snapshot is maintained, but such that the virtual machine snapshot runs more efficiently when instantiated. Cleaning of a virtual machine snapshot can occur immediate before the virtual machine is instantiated based on the virtual machine snapshot or can occur after the virtual machine snapshot is captured and before storage.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a method 100 of generating a fresh machine image 116, in accordance with one example, that uses a first boot volume 104, a machine image extractor 110, and a second volume 114. In various examples, a machine image 102, 116 can comprise a copy of a state of a computer machine image, which can be stored in a non-volatile form such as a file, or the like. For example, a machine image 102, 116 can include files for launching and running a computer image, a virtual machine, an operating system, operating system settings, software programs, data files, and the like.

In various examples, a machine image 102, 116 allows a machine or virtual machine to be shut down and subsequently restored to the same state. Accordingly, a machine image 102, 116 can be used to backup and restore a lost or corrupted machine or virtual machine. Additionally, in virtual computing operating environments, as discussed below, a machine image 102, 116 can be used to instantiate a virtual machine comprising an operating system defined by the machine image 102, 116. A machine image 102, 116 can be stored in virtual or non-virtual memory.

In various examples, the first and/or second volume 104, 114 can comprise a portion of a virtual or non-virtual data storage device. Additionally, the first and/or second volume may or may not be a boot volume and can comprise any suitable memory, storage, volume, or the like. For example, first and/or second volume 104, 114 can comprise a physical drive or a virtual drive. The machine image extractor 110 can comprise one or more software programs and/or devices operable to perform various actions as described in this disclosure. In one example, the machine image extractor can comprise the Microsoft ImageX tool.

As illustrated, a used machine image 102 is loaded into a first boot volume 104 and machine image data 106 is sent to an extractor volume 108 of a machine image extractor 110. Extracted machine image data 112 is sent to a new second volume 114, where a fresh machine image 116 is generated that corresponds to the used machine image 102.

In various examples, executing a machine image over time causes "bloating" of the machine image. In other words, use of a machine image can inherently cause increasing inefficiencies in how machine image data is stored and distributed in a memory. For example, continued use of a machine image can cause the machine image to run slower and to use more memory, disk space, and processing power. In one example, use of a machine image over time causes files to be written in non-sequential blocks of the disc so that seek time of the disc is slower. Generating a fresh machine image 116 can increase the speed of the machine image when executing and to reduce the use of memory, disk space, and processing power by reordering machine image data at a block-level, compressing machine image data, removing redundancies in machine image data and/or removing extraneous machine image data.

In some examples, methods for generating a fresh machine image 116 are applied to virtual computing environments and/or non-virtual computing environments. Additionally, any suitable type of operating system and/or machine image can the subject of the systems and methods described in this disclosure, including Microsoft Windows, Macintosh IOS, Linux, Google Android, and the like. Additionally, such operating systems and/or machine images can be associated with any suitable device, including a desktop computer, laptop computer, smartphone, gaming device, entertainment system, wearable device, heads-up display, vehicle computer, super-computing system, and the like.

Figure 2:
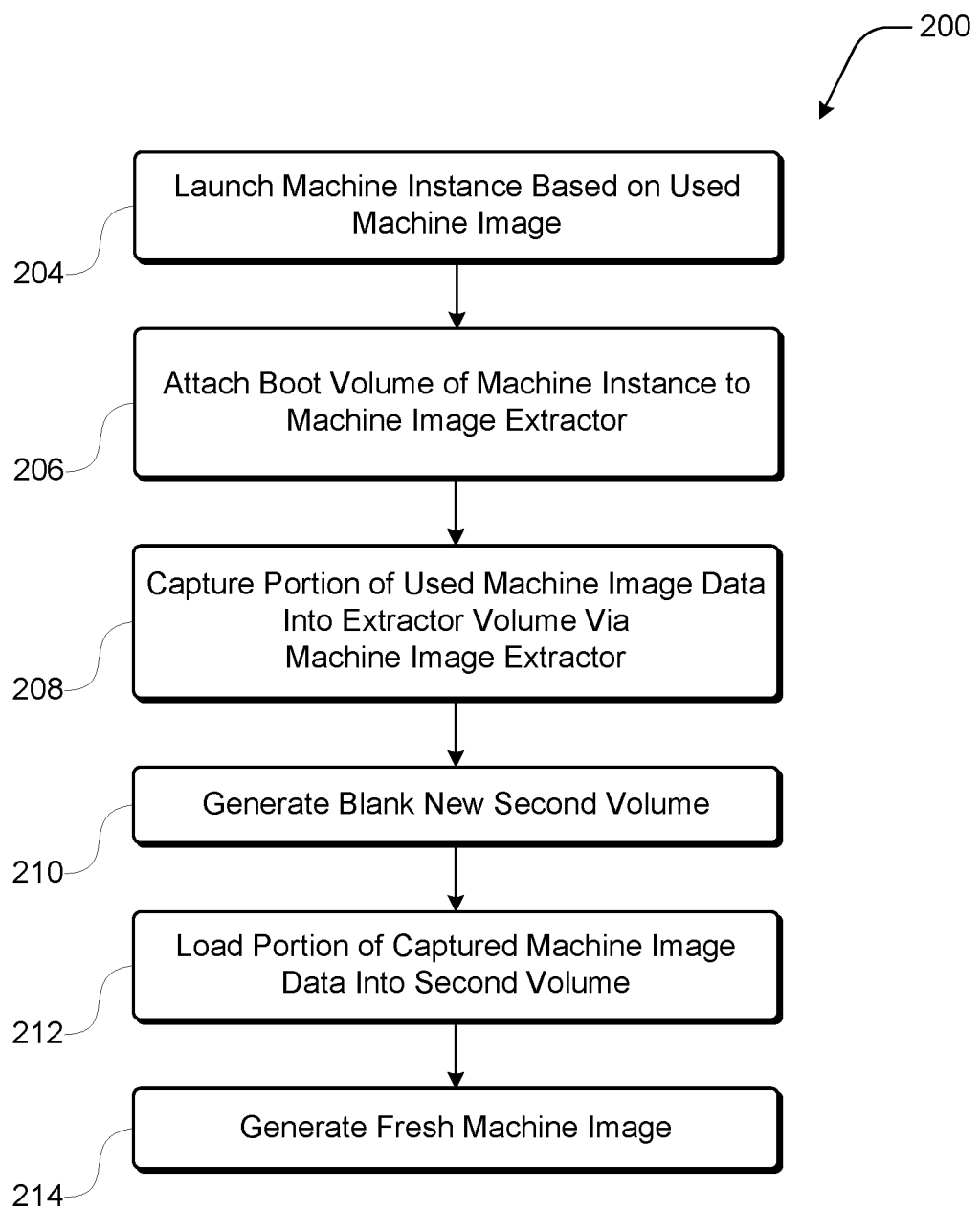
FIG. 2 is a block diagram illustrating a method of generating a fresh machine image, in accordance with another example.

FIG. 2 is a block diagram illustrating a method 200 of generating a fresh machine image, in accordance with another example. Although this example, relates to a virtual computing environment, it should be clear that further examples can include computing environments that are completely or partially non-virtual. In various examples the method 200 can be performed by a web services system 504 of FIG. 5, a virtual computer system service 602 of FIG. 6, a virtual computer system service 708 of FIG. 7, or the like.

The method 200 begins where an instance of a machine image is launched 204 based at least in part on a used machine image. In various examples, a used machine image can be a machine image that has been executed for any amount of time after an original installation of the machine image; after instantiation from a machine image snapshot; after generation of a fresh machine image as described in this disclosure, or the like. For example, time of execution can be any suitable amount of time including an amount of seconds, minutes, hours, days, weeks, months, years, and the like. Execution can occur in a virtual or non-virtual computing environment.

A boot volume of the machine instance can be attached 206 to a machine image extractor. In some examples, attaching a boot volume of the machine instance can include making a virtual drive operably connected to and/or accessible by a machine image extractor over a network. In some examples, attaching a boot volume to a machine instance can comprise physically coupling of devices and/or communication ports. In other examples, attaching a boot volume can include attachment to virtual computing resources, including a virtual computing instance. Additionally, in various embodiments, the machine instance is stopped, shut down, suspended, or the like before the boot volume of the machine image is attached or otherwise associated with the machine image extractor.

The used machine image data can be captured 208 from the first boot volume to an extractor volume by a machine image extractor. In some examples, the machine image extractor can selectively capture objects based at least in part on a black-list or white-list or other suitable capture criteria. Selectively capturing a portion of the used machine image data can serve to select files that will preserve the state of the machine image defined by the used machine image data, while not capturing files that are unnecessary for preserving the state of the machine image defined by the used machine image data. For example, redundant files, temporary files, and the like, can be selected for non-capture.

Returning to the method 200, a blank new second volume can be generated 210. Generating a new second volume can include configuring a suitable file structure, block structure, sector structure, and the like, which can be defined based at least in part on the type of machine image that will be loaded into the first boot volume. Additionally, configuring the new second volume can include use of boot volume metadata associated with the first boot volume. Such configuring can make the second volume bootable and thereby make the second volume a second volume. The machine image extractor can extract 212 a portion of the captured machine image data into the second volume and a fresh machine image can be generated 214.

In various examples, capturing 208 a portion of the used machine image data from the first boot volume and/or loading 212 a portion of the captured machine image data on the new fresh second volume can remove inefficiencies and bloating that may be present in the used machine image. For example, duplicate machine image files can be removed, extraneous machine image files can be removed, the size of machine image files can be compressed, and the process of laying down the extracted machine image on the new second volume can provide for a more efficient arrangement of the machine image data on the new second volume compared to the arrangement of the machine image data in the first machine image. For example, a process for laying down the extracted machine image data at a block level can include selecting a starting point on the new second volume and contiguously laying down data beginning at this starting point.

In various examples, the process of capturing 208 a portion of the used machine image data from the first boot volume and/or loading 212 a portion of the extracted machine image data to the new fresh second volume can maintain the configuration state of the machine image while also removing unnecessary files, compacting portions of the machine image data, and reordering the machine image data in a more efficient way. In other words, the generated 214 fresh machine image copy can maintain the same configuration, capabilities and state of the used machine image, even though the underlying data has been edited, compressed and/or rearranged to generate a smaller and/or more efficient new machine image compared to the used machine image.

Figure 3:
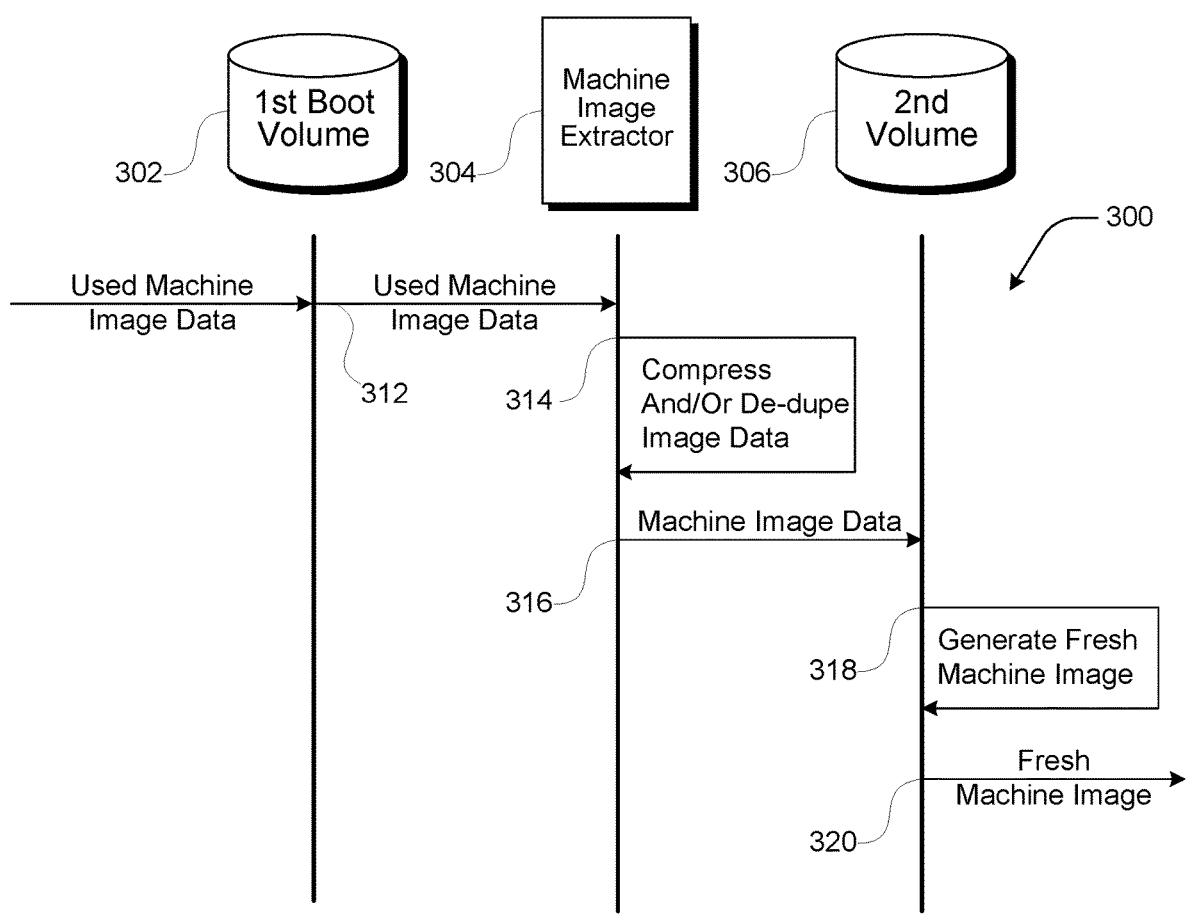
FIG. 3 is a data flow diagram illustrating communications between a first boot volume, a machine image extractor and a second volume for generating a fresh machine image in accordance with a further example.

FIG. 3 is a data flow diagram illustrating communications 300 between a first boot volume 302, a machine image extractor 304 and a second volume 306 for generating a fresh machine image in accordance with a further example. As discussed, in various examples, the first and/or second volume 302, 306 can comprise a portion of a virtual or non-virtual data storage device. For example, first and/or second volume 302, 306 can comprise a physical drive or a virtual drive. The machine image extractor can comprise one or more software programs and/or devices operable to perform various actions as described in this disclosure.

The communications 300 begin where used machine image data is loaded into the first boot volume 302 and then the used machine image data is captured 312 by a machine image extractor, where compression and de-duping 314 of the machine image data can occur. The extracted machine image data is laid down 316 on the second volume 306, where a fresh machine image is generated 318. The fresh machine image can be sent 320 to various suitable locations including a storage location, another boot volume, another device, or the like. In some examples, the fresh machine image can be prepared for a single customer of web services or can be prepared for use by a plurality of customers.

In various examples, used machine image data can comprise various suitable types of data including boot configuration data, machine image metadata, machine image files, boot sector data, and the like. Additionally, in various examples, the fresh machine image copy generated by capturing 312 used machine image data from a first boot volume 302 and extracting 316 captured machine image data to a new fresh second volume 306 generates a fresh copy of the machine image that is not a file copy of the machine image and/or not a block-level copy of the machine image. In other words, in some examples, the fresh machine image copy is not a file copy where files are transferred without reference to block-level structure and in some examples the machine image is not a block-level copy where blocks are copied without reference to block contents.

In contrast, in various examples, the copy process can read a set of machine image configuration data on the first boot volume 302, which provides an awareness of how the file structure works. The data can be read, compressed and duplicate files can be removed, but no organizational structure is preserved during extraction and compression in various examples. Accordingly, when the machine image data present at the machine image extractor 304 is extracted 316 to the fresh second volume 306, the machine image data can be laid down sequentially, which creates an efficient order for the data on the fresh second volume 306. In other words, laying down machine image data can begin at the beginning of the fresh second volume 306 and write forward, which can provide an efficient structure for the machine image data. For example, this can be analogous to a default installation of the machine image data.

In various examples, extraction of machine image data from the first boot volume 302 can comprise various suitable steps. For example, the machine image extractor can read the first boot volume 302 to identify a file structure (e.g. New Technology File System or "NTFS" file structure) and identify a set of machine image objects such as directories, files, folders, and the like. These identified machine image objects can be copied to a temporary directory or other memory at the machine image extractor 304 in a suitable file format, which may or may not be a compressed file format (e.g., Windows Image Format or "WIM").

In some examples, extracting machine image objects from the first boot volume 302 can comprise use of white-listing and/or black-listing of certain machine image objects. In other words, certain machine image objects can be specifically identified for exclusion from extraction or specifically identified for inclusion in an extraction. For example, in various examples, it can be desirable to exclude files that are not necessary or non-essential to the machine image in an extraction, including temporary files, kernel-related files, and the like.

Additionally, extracting machine image data by the machine image extractor 304 can comprise reading boot sector data at the first boot volume 302 and storing boot sector metadata corresponding to the boot sector data at the machine image extractor 304. For example, in one implementation, such boot sector metadata can be stored in the compressed file comprising extracted machine image objects. In other words, boot sector metadata can be extracted so that partitioning information of the first boot volume 302, and the like, can be preserved.

Accordingly, in various examples, information about the boot sector can be extracted without directly copying the boot sector. In other words, the boot sector from the first boot volume 302 can be re-created on the second fresh boot volume 306, based at least in part on boot sector metadata, but without directly copying the boot sector. In so doing, essential information about the boot sector can be re-created at the second fresh boot volume 306, which can include partitioning information, and the like.

In various embodiments, generating a fresh second volume 306 can comprise preparing and partitioning of the fresh second volume 306, which may be necessary so that the fresh second volume 306 becomes writable and recognizable by the machine image extractor 304.

In various examples, generating 318 the fresh machine image can comprise comparing the extracted machine image metadata present on the fresh second volume 306 to machine image metadata present on the first boot volume 302. In some examples, it can be necessary to modify machine image metadata present on the fresh second volume 306 to correspond to machine image metadata present on the first boot volume 302. Comparing the machine image metadata present on the first and second volumes 302, 306 can be done in any suitable way, including an item-by-item comparison, or overwriting a portion of the machine image metadata present on the second volume 306 with default machine image metadata.

Additionally, in some examples, additional metadata or other files can be appended to the machine image data present on the second volume 306, which can include metadata or data corresponding to operation of the machine image in a certain computing environment, which may or may not be a virtual computing environment.

As discussed herein, in various examples, the machine image extractor can operate outside of the operating system file structure while also not being limited by the block structure of the boot volume. For example, FIG. 4 illustrates the transfer of machine image data from a first boot volume to a second volume for generating a fresh machine image in accordance with one example.

FIG. 4 illustrates a first and second volume 400A, 400B where each boot volume 400 is broken up into a plurality of sub-system blocks 402. In this example, each boot volume 400 comprises at least three blocks 402, and more specifically the first boot volume 400A comprises first, second, and third blocks $402A_1$, $402B_1$, $402C_1$ and the second volume 400B comprises first, second, and third blocks $402A_2$, $402B_2$, $402C_2$. In one example, each block 402 can consist of 4 Mb of memory space, but further examples can have any suitable size of regular or irregular blocks 402 and can comprise any suitable number of blocks 402.

In various examples, data 404 can initially be written to the blocks 402 contiguously so that the blocks 402 are without a substantial amount of open space 406 between portions of data 404. However, as copy, delete and other operations are performed on data 404 present in the boot volume, unused space 406 can become present within blocks 402 of the boot volume as illustrated in the first boot volume 400A on the left in FIG. 4.

In various examples, the unused space 406 within blocks 402 can be recognized as unused space by a file system kernel, but where a given block 402 comprises any data 404 the block 402 may be identified as a used block by an underlying disc infrastructure. In some examples, sub-system trimming operations can be used to clean up a boot drive 400 by marking blocks 402 having unused data, which allows new data 404 to be written to that block 402. However, where any data 404 is stored in a block 402, such a sub-system trimming operation would not be able to recapture the block for use 402.

For example, block $402B_1$ of the first boot volume 400A is shown having a relatively small amount of data 404(H), and a large amount of unused space 406 that cannot be efficiently used. Unfortunately, the large amount of unused space in block $402B_1$ cannot be recaptured for use as long as data 404(H) remains stored in block $402B_1$. In various examples, a file system associated with the boot volume 400 does not recognize the boundaries of sub-system blocks 402 and can instead have an independent partitioning of blocks, sectors, and the like.

Accordingly, in the present example, the file system may not be able to recognize that data 404(H) is creating a large amount of unused space on block $402B_1$ that cannot be recaptured for efficient use. Therefore, the free space in block $402B_1$ may not become usable again unless there is a chance removal of data 404(H) from block $402B_1$ by the operating system, which as discussed, may not be aware of the boundaries of the blocks 402.

In some examples, operating system operations such as defragment can be used to make a boot volume 400 operate more efficiently by logically reordering blocks of the boot volume 400. However, when the operating system writes to logically synchronous blocks, the data may actually span multiple physical blocks 402, which does not solve the issue related to small bits of data 406 preventing full blocks from being recaptured. Accordingly, the operating system is unable to effectively clean up the disc and the sub-system is also unable to effectively clean up the disc, which results in an increasingly bloated disc over time as the machine image operates.

This disclosure includes various examples where machine image data 206 can be captured from a used and bloated first boot volume 400A and extracted contiguously onto a fresh boot volume 400B to remove bloating that was present in the first boot volume 400A. As illustrated in FIG. 4, the used first boot volume 400A comprises data portions A-J, which span three blocks $402A_1$, $402B_1$, $402C_1$. In accordance with various examples of this disclosure, a portion of the data portions A-J are illustrated being present in fresh boot volume 400B after being extracted and laid down contiguously in the fresh boot volume 400B.

More specifically, data portions A-F, H, and I are shown being present in block $402A_2$, leaving blocks $402B_2$, $402C_2$ having completely open space 406 and leaving some open space 406 in block $402A_2$. Accordingly, as discussed in various examples, capturing and extraction of data 406 from a first boot volume 400A to a second volume 400B can result in a more efficient arrangement of data and can result in a machine image comprising less data where some portions of data 406 are selectively not captured or extracted to the second volume 400B.

Additionally, FIG. 4 illustrates that in some examples a bloated used machine image may have blocks with part needed data and part unneeded data. Accordingly, in various examples, capturing of used machine image data can include capturing needed data but not the unneeded data to subsequently create new blocks on a new second volume. In doing so, needed data can be contiguously and/or sequentially written to the second volume, which generates a more efficient arrangement of the machine image data such that files are located on the same or adjacent block and such that data is more closely packed on blocks compared to packing of blocks in the used machine image.

In some examples, all data can be captured from the first boot volume 400A by the extractor and a portion of the captured data can be selectively extracted or laid down on the second volume 400B. In other examples, a portion of the data on the first boot volume 400A can be captured by the extractor and a portion of the captured data can be selectively extracted or laid down on the second volume 400B. In further examples, a portion of the data on the first boot volume 400A can be captured by the extractor and all of the captured data can be selectively extracted or laid down on the second volume 400B.

Figure 5:
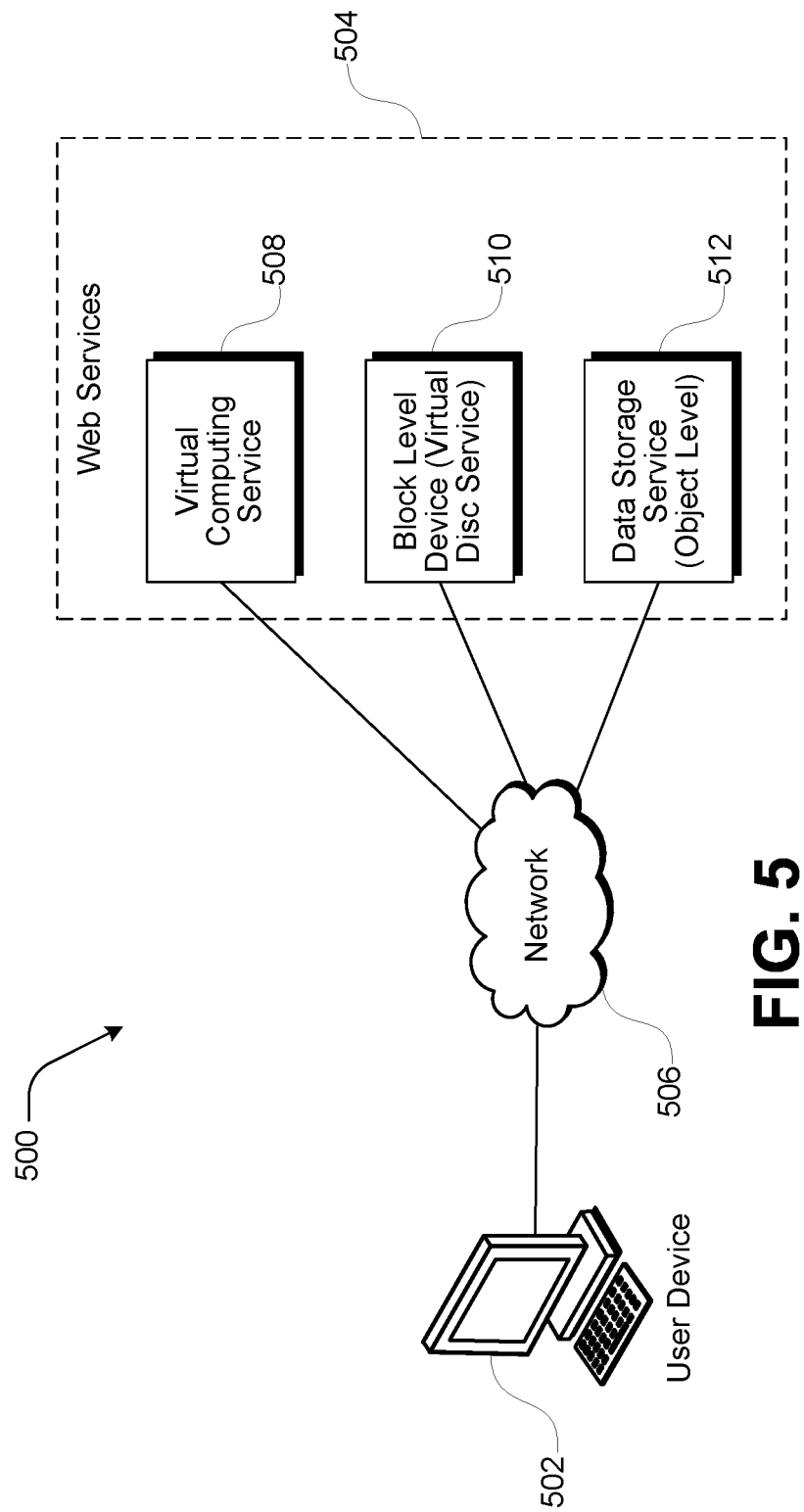
FIG. 5 illustrates an example operating environment including a user device and a set of web services that are operably connected via a network.

FIG. 5 illustrates an example operating environment 500 including a user device 502 and a set of web services 504 that are operably connected via a network 506. The web services 504 can include a virtual computing service 508, a block level device 510 and an object level data storage service 512.

In some examples, the virtual computing service 508 can comprise a plurality of physical hosts that can include one or more servers having hardware that is operable to instantiate virtual machines. The block level storage device 510 can include a virtual disc service where virtual machine images can be loaded and run. Such virtual machine images can be stored in the object level data storage service 512.

In one example, the user device 502 can send a request to launch a virtual machine to the web services 504. A previously used virtual machine image can be obtained from the object level data storage service 512 and loaded into the block level device 510. One or more virtual disc defined by the block level device 510 can be virtually attached to the virtual computing service 508, which can instantiate one or more virtual machine from the one or more attached virtual discs defined by the block level device 510.

In various examples, a snapshot of a running virtual machine can be generated, which can save the state information of the running virtual machine so that it can be later instantiated having the same state. Such snapshots or images of the virtual machine can be stored in the object level data storage service 512 for later use as described above. Alternatively, a fresh virtual machine instance can be instantiated based on a template. Such templates can be stored in the object level data storage service 512.

Figure 6:
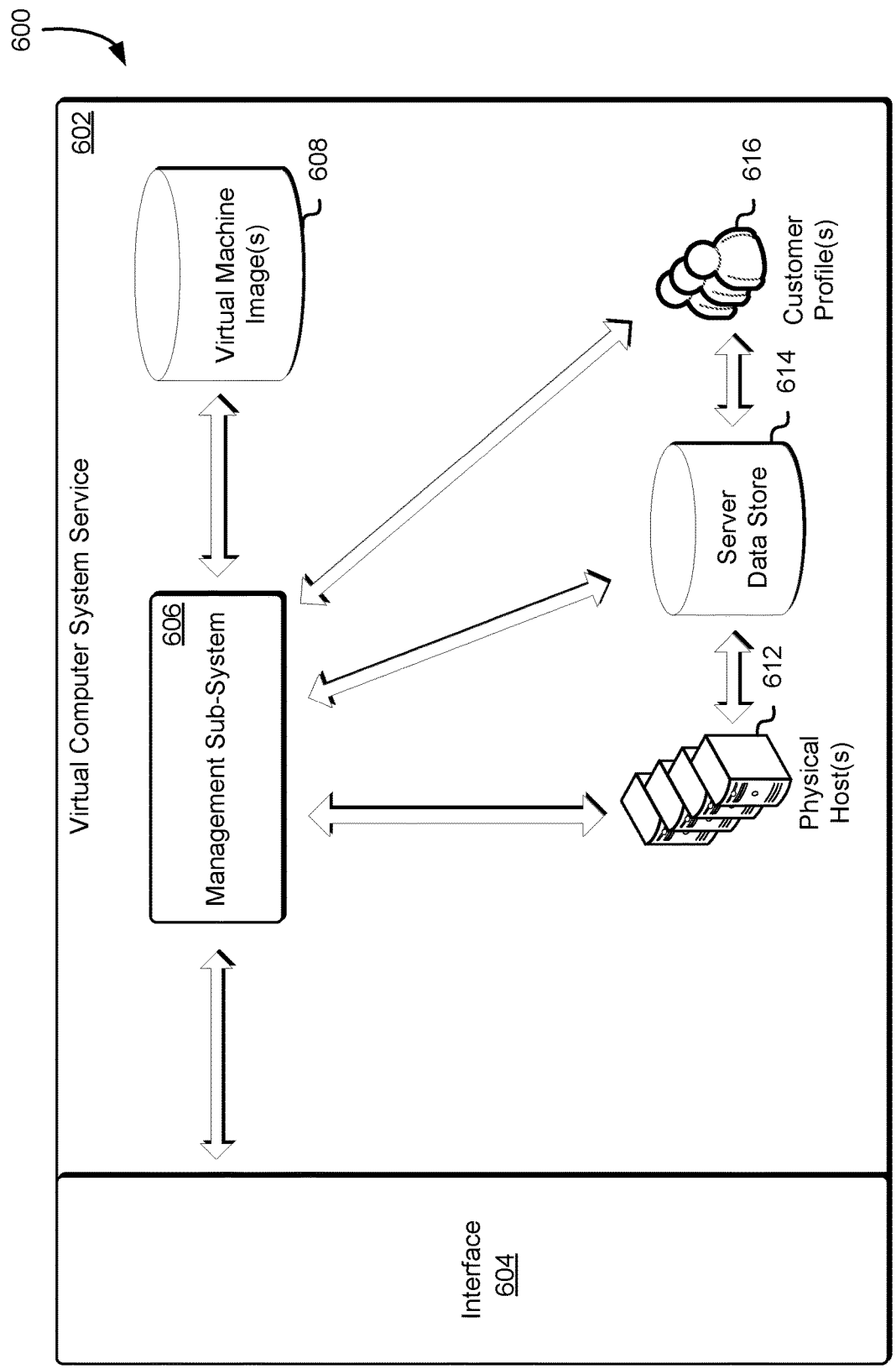
FIG. 6 illustrates an example operating environment of a virtual computing service in accordance with another example.

As noted above, a customer may interact with a virtual computing system service to launch a virtual machine instance within one a physical host. Accordingly, FIG. 6 shows an illustrative example of an environment 600 in which one or more virtual machine images 608 are instantiated within one or more virtual hosts 612 upon customer request in accordance with at least one embodiment. The virtual computer system service 602 may provide customers with a customer interface 604 that may enable a customer to access the virtual computer system service 602.

A customer may utilize the customer interface 604 through one or more communications networks, such as the Internet. The customer interface 604 may contain certain security safeguards to ensure that the customer has authorization to access the virtual computer system service 602. For instance, in order to access the virtual computer system service 602, a customer may need to provide a username and a corresponding password or encryption key when using the customer interface 604. Additionally, requests (e.g., API calls) submitted to the customer interface 604 may require an electronic signature generated using a cryptographic key such that the electronic signature is verifiable by the virtual computer system service 602, such as by an authorization system (not shown).

Once the customer has gained access to the virtual computer system service 602 through the customer interface 604, the virtual computer system service 602 may allow the customer to interact, through the customer interface 604, with a management sub-system 606. For instance, the management sub-system 606 may enable a customer to remotely provision a virtual machine instance. A customer may use the customer interface 604 and the management sub-system 606 to generate a virtual machine instance that includes an operating system and a variety of applications suited to the customer's needs. The operating system and the various applications may be maintained in data storage in the form of virtual machine images 608. The virtual computer system service 602 may maintain a variety of virtual machine images 608 based on specific customer preferences, as specified in the management sub-system 606. When a customer submits a request for provisioning a virtual machine instance through the management sub-system 606, the virtual computer system service 602 may identify the machine image the customer has requested and allocate the resources necessary (e.g., the processors and random-access memory (RAM) required to operate the components of the machine image) to process the machine image. The machine image may be instantiated on one or more physical hosts 612.

In one example, a customer, through the customer interface 604, submits a request to the virtual computer system service 602 to provision and/or reserve one or more physical host 612 for his/her virtual machine instances. This request may be submitted through an "AcquireServer" web service or other API call to the service 602 and may include various parameters such as an account identifier for the customer, virtual machine instance types, information such as a number of processors, amount of memory amount of networking capacity, etc. Additionally, if the customer wishes to reserve a server, the request may be submitted through a "PurchaseReservedServer" web service or other API call to the service 602.

In response to the request, the management sub-system 606 may access a server data store 614 to identify, from a pool of physical hosts 612 having free capacity, one or more physical host 612 that may be reserved for the customer to fulfill his/her request. In some embodiments, the virtual computer system service 602 may maintain a general pool of physical hosts 612 that the management sub-system 606 may utilize to identify one or more physical hosts, or a portion thereof, that may be allocated to the customer for use. Once the management sub-system 606 has identified the one or more physical hosts 612 to be allocated to the customer, the management sub-system 606 may access the server data store 614 to specify, within a database, which physical hosts 612, or portions thereof have been allocated for use of the customer.

Once one or more physical hosts 612 have been allocated for the customer, the customer, through the interface 604, can submit a request (e.g., "RunInstances" web service or other API call) to the virtual computer system service 602 to instantiate one or more virtual machine images 608 onto one of these allocated servers 612 and/or a portion thereof. For instance, in an embodiment, the customer, through the interface 604, submits a request to the management sub-system 606 (e.g., "DescribeServers" web service or other API call) to obtain an identifier for each physical host 612 allocated for the customer or otherwise being utilized by the customer.

Once the customer has obtained these one or more server identifiers from the management sub-system 606, the customer may generate a request that may include an identifier corresponding to the physical host(s) 612 that should be used for instantiating the virtual machine image 608. The management sub-system 606 may instantiate the virtual machine image 608 on the selected physical host(s) 612, if the physical host(s) 612 have sufficient capacity to support the virtual machine instance. In some embodiments, the management sub-system 606 may include a placement server, which may be configured to select from the plurality of servers 612 a server for the virtual machine instance in a manner that respects a plurality of dedications in the server data store 614.

Figure 7:
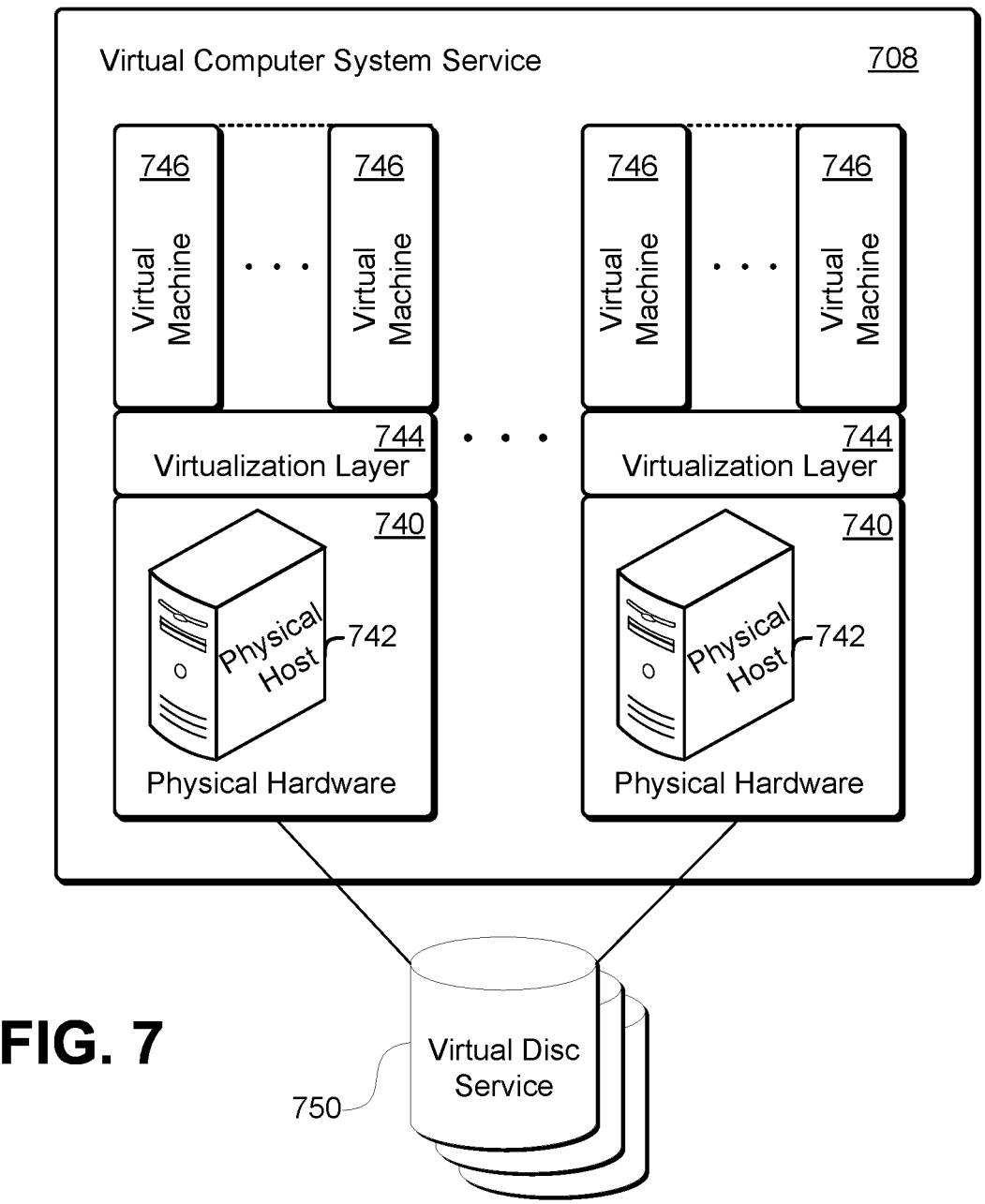
FIG. 7 illustrates a virtual computer system service in accordance with at least one embodiment.

FIG. 7 illustrates a virtual computer system service in accordance with at least one embodiment. The virtual computer system service 708, which can comprise physical hardware 740, can be used by a computing resource service provider for providing computation resources for customers. The physical hardware 740 may include one or more physical hosts 742. The physical hosts 742 may be any device or equipment configured to execute instructions for performing data computation, manipulation, or storage tasks, such as a computer or a server.

A physical host 742 may be equipped with any needed processing capability including one or more processors, such as a central processing unit (CPU), a graphics processing unit (GPU) or a digital signal processor (DSP), memory, including static and dynamic memory, buses, and input and output ports that are compliant with any handshaking, communications, or data transfer protocol. The physical hardware 740 may also include storage devices, such as storage disks and tapes, networking equipment and the like and/or can be coupled to virtual disc service 750.

A virtualization layer 744 in the computing resources service provider can enable the physical hardware 742 to be used to provide computational resources upon which one or more virtual machines 746 may operate. The virtualization layer 744 may be any device, software, or firmware used for providing a virtual computing platform for the virtual machines 746. The virtual computing platform 708 may include various virtual computer components, such as one or more virtual CPUs, virtual memory and the like. The virtual machines 746 may be provided to the customers of a computing service resource provider and the customers may run an operating system or an application on one or more virtual machines 746. Further, the computing service resource provider may use one or more of its own virtual machines 746 for executing its applications. Examples of the virtualization layer 744 include a hypervisor.

The virtualization layers 7440 can provide a host activity report associated with the physical hardware 740, one or more physical hosts 742 or the one or more virtual machines 746. The host activity report may include utilization, activity or operational information or statistics for the physical hardware 740, physical hosts 742, virtual machines 746 or applications that are executed on the physical hosts 742 or the virtual machines 746. The information included in the host activity report may be gathered or compiled over an interval of time or taken at one or more snapshots in time.

Figure 8:
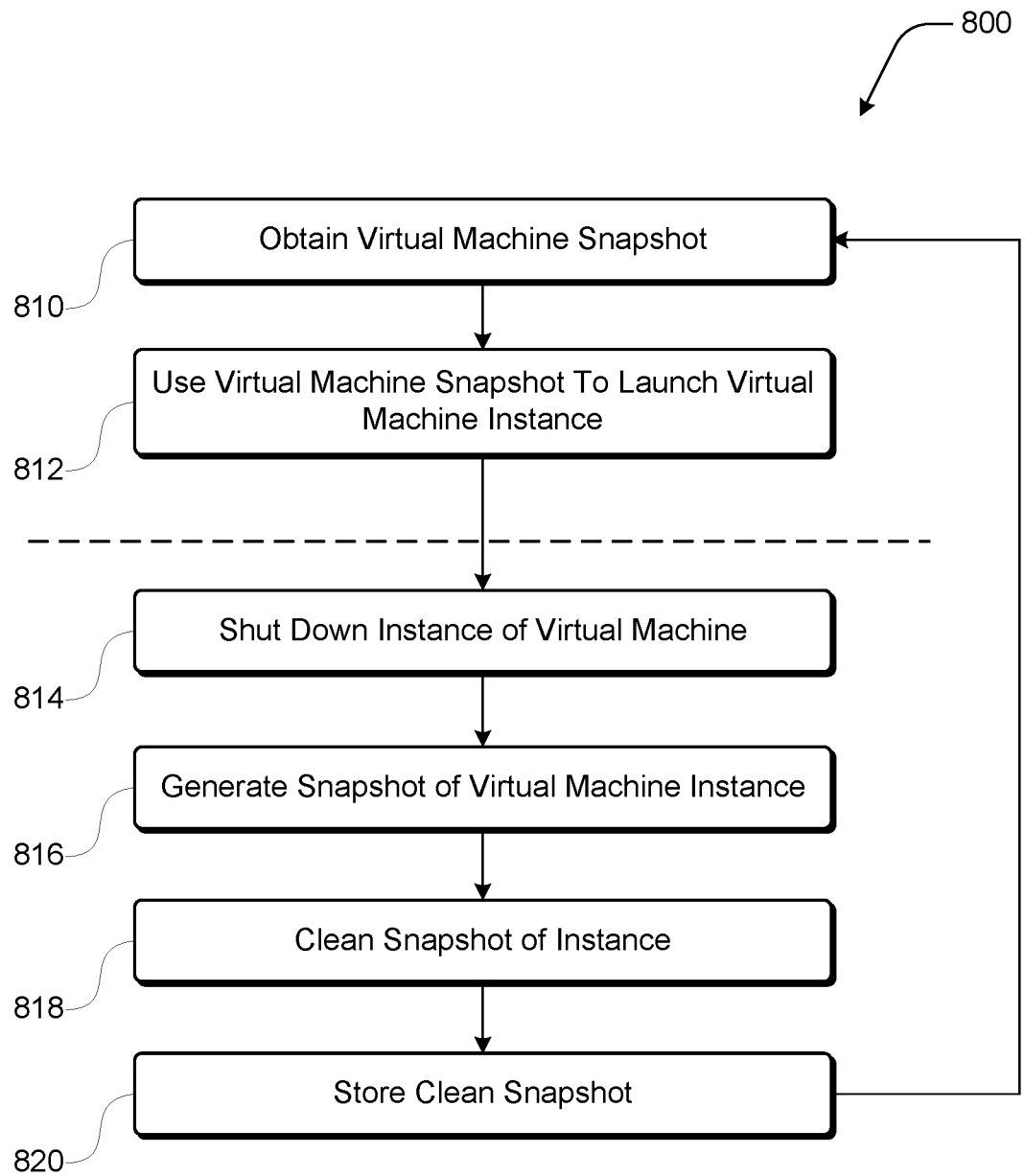
FIG. 8 is a block diagram illustrating a method for instantiating a virtual machine instance from a virtual machine image snapshot, in accordance with a further example.

FIG. 8 is a block diagram illustrating a method 800 for instantiating a virtual machine instance from a virtual machine image snapshot, in accordance with one example. The method 800 begins where a virtual machine snapshot is obtained 810 and the virtual machine snapshot is used to launch 812 a virtual machine instance. As discussed, in some examples, a virtual machine snapshot can be stored in an object level data storage service, and loaded into a block level virtual disc service, where it can be instantiated by a virtual computing service.

The virtual machine instance can execute for any suitable length of time, which can be in a number of seconds, minutes, hours, days, months, years, or the like. At some time, the virtual machine instance can be shut down 814 and a snapshot of the virtual machine instance can be generated 816, both of which may occur concurrently or substantially at the same time. In addition, the snapshot may be taken before the shutdown of the virtual machine instance. In various examples, a snapshot of the virtual machine instance can preserve the state of the virtual machine instance so that the virtual machine can be later instantiated having the same state as when the snapshot was captured. In other words, the virtual machine can be saved for use at a later time.

As discussed, in some examples, running a virtual machine image over time can generate bloating of the image in the file structure, inefficient storage of the image in block level storage, generation of duplicate virtual machine image data, generation of extraneous virtual machine image data, and the like. Accordingly, the snapshot of the virtual machine instance can be cleaned 818 and stored 820 for later instantiation. In various examples, cleaning 818 of the virtual machine instance can include capture and compression of virtual machine image data by a machine image extractor and extraction to a second fresh boot volume by the machine image extractor.

Figure 9:
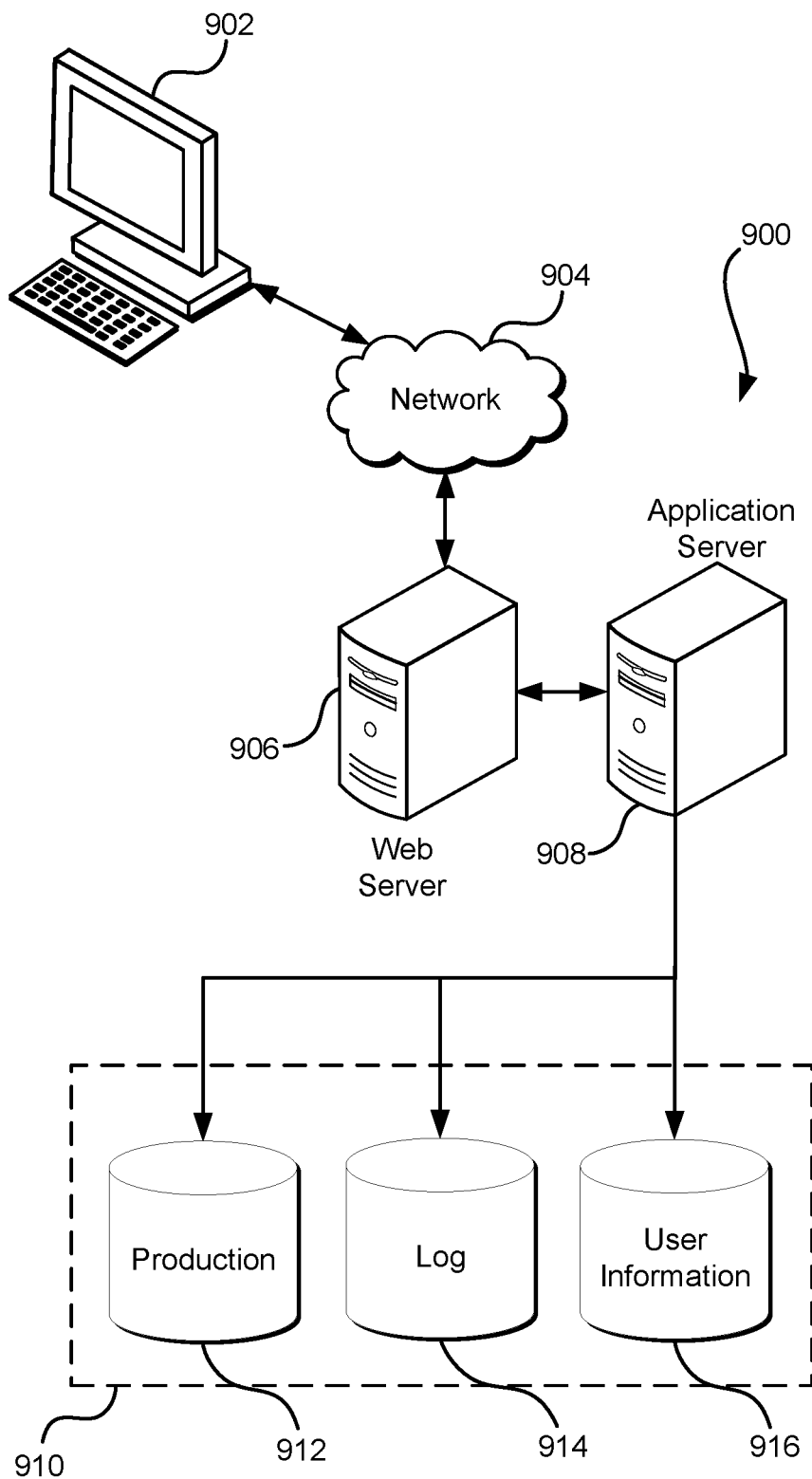
FIG. 9 illustrates an operating environment in which various described examples can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
attaching a boot volume to a machine image extractor, the boot volume storing a used machine image comprising machine image data associated with a machine image that has been executed for an amount of time;
capturing, by the machine image extractor, at least a portion of the machine image data of the used machine image to generate captured machine image data;
generating a second volume based at least in part on information extracted from a boot sector of the boot volume;
extracting, by the machine image extractor, at least a portion of the captured machine image data;
generating a cleaned machine image on the second volume based at least in part on the portion of the captured machine image data by at least:
identifying a set of data blocks of the boot volume included in the portion of the captured machine image data to include in the cleaned machine image by at least comparing machine image metadata stored in the second volume with machine image metadata stored in the boot volume;

determining, based at least in part on the metadata stored in the second volume, a subset of data blocks of the set of data blocks unnecessary for preserving a state of the machine image, where the state represents memory contents after execution for the amount of time;

compressing the subset of data blocks to generate a set of compressed data blocks;

reordering contents of the set of compressed data blocks to reduce a size of the second volume; and contiguously writing the set of compressed data blocks starting at a point of the second volume;

storing the second volume in a data store; and instantiating a computer resource based at least in part on the cleaned machine image stored on the second volume, where the computer resource has the state of the machine image based at least in part on the subset of data blocks.

2. The computer-implemented method of claim 1, wherein the machine image comprises an operating system image.

3. The computer-implemented method of claim 1, further comprising:

instantiating a first virtual machine instance based at least in part on a first machine image;

generating a snapshot of the first virtual machine instance that includes the used machine image; and instantiating a second virtual machine instance based at least in part on the cleaned machine image.

4. A system, comprising:

a boot volume; and a machine image extractor that:

captures a portion of a set of used machine image data of a used machine image stored in the boot volume to generate a set of captured machine image data, the set of captured machine image data being usable to maintain a state of the used machine image; and extracts a portion of the set of captured machine image data; and a second volume that:

obtains, from the machine image extractor, the portion of the set of captured machine image data;

generates a cleaned machine image within the second volume based at least in part on the portion of the set of captured machine image data such that the cleaned machine image has the state of the used machine image by at least:

compressing a plurality of blocks containing the portion of the set of captured machine image data to generate a compressed plurality of blocks; and writing the compressed plurality of blocks containing the portion of the set of captured machine image data contiguously to the second volume, wherein unused space in at least one data block in the cleaned machine image is reduced compared to the used machine image based at least in part on an order of the portion of the set of captured machine image data included in the plurality of blocks contiguously written to the second volume; and overwrites metadata stored within the second volume with another metadata based at least in part on a comparison between the boot volume and the second volume.

5. The system of claim 4, wherein a size of the used machine image is larger than a size of the cleaned machine image.

6. The system of claim 4, wherein the boot volume and the second volume are instantiated in a virtual disc service.

7. The system of claim 4, wherein the machine image extractor further reads the boot volume to identify a file structure of the boot volume and to identify a set of machine image objects stored on the boot volume, and wherein capturing the portion of the set of used machine image data stored in the boot volume further comprises capturing a second portion of the set of machine image objects stored on the boot volume.

8. The system of claim 4, wherein the machine image extractor selects machine image data for capturing based at least in part on an exclusion list.

9. The system of claim 4, wherein the machine image extractor reads boot sector data stored on the boot volume to generate boot sector metadata corresponding to the boot sector data and wherein the machine image extractor formats the second volume based at least in part on the boot sector metadata.

10. The system of claim 4, wherein the cleaned machine image is a copy of at least a portion of the used machine image without being a file-level copy and without being a block-level copy.

11. A non-transitory computer-readable storage medium storing thereon executable instructions that, as a result of being executed by one or more processors of a computer system, cause the computer system to:

capture a portion of a set of used machine image data stored in a first volume to generate a set of captured machine image data, the set of used machine image data associated with a used machine image that has been executed for an amount of time, the set of captured machine image data excluding machine image data that is not used to preserve a state of the used machine image;

reduce a size of the portion of the set of captured machine image data by at least removing data not associated with state information of the used machine image to generate a set of data blocks;

compress the set of data blocks while maintaining a configuration associated with the portion of the used machine image to generate a set of compressed data blocks; and write the set of compressed data blocks to a second volume contiguously from a start point of the second volume to generate a cleaned machine image, wherein unused space in the cleaned machine image is reduced compared to the used machine image and the cleaned machine image maintains the state of the used machine image.

12. The non-transitory computer-readable storage medium of claim 11, wherein the instructions further comprise instructions that, as a result of being executed by the one or more processors, cause the computer system to generate a size of the cleaned machine image that is smaller than a size of the used machine image.

13. The non-transitory computer-readable storage medium of claim 11, wherein the instructions further comprise instructions that, as a result of being executed by the one or more processors, cause the computer system to read boot sector data stored on the first volume to generate boot sector metadata corresponding to the boot sector data and format the second volume based at least in part on the boot sector metadata.

14. The non-transitory computer-readable storage medium of claim 11, wherein the instructions further comprise instructions that, as a result of being executed by the one or more processors, cause the computer system to store the cleaned machine image in a repository.

15. The non-transitory computer-readable storage medium of claim 11, wherein the instructions further comprise instructions that, as a result of being executed by the one or more processors, cause the computer system to generate the second volume prior to writing the set of compressed data blocks to the second volume.

16. The non-transitory computer-readable storage medium of claim 11, wherein the instructions further comprise instructions that, as a result of being executed by the one or more processors, cause the computer system to generate the cleaned machine image as a copy of at least a portion of the used machine image.

17. The non-transitory computer-readable storage medium of claim 11, wherein the instructions further comprise instructions that, as a result of being executed by the one or more processors, cause the computer system to:
    instantiate a first computer instance based at least in part on a first machine image;
    generate a snapshot of the first computer instance that includes the used machine image; and
    instantiate a second computer instance based at least in part on the cleaned machine image.

18. The non-transitory computer-readable storage medium of claim 13, wherein the instructions that cause the computer system to write the set of compressed data blocks to the second volume contiguously further comprise instructions that, as a result of being executed by the one or more processors, cause the computer system to write the set of compressed data blocks to the second volume sequentially based at least in part on an order indicated in the boot sector metadata.

19. The non-transitory computer-readable storage medium of claim 11, wherein the instructions that cause the system to compress the set of captured machine image data further comprise instructions that, as a result of being executed by the one or more processors, cause the computer system to compress the set of captured machine image data by at least defragmenting the first volume.

20. The non-transitory computer-readable storage medium of claim 11, wherein the instructions that cause the system to write the set of compressed data blocks to the second volume contiguously further comprise instructions that, as a result of being executed by the one or more processors, cause the computer system to write the set of compressed data blocks to a plurality of blocks of the second volume such that there are no unused blocks between members of the plurality of blocks of the second volume.

* * * * *